(12) United States Patent
Targhi et al.

(10) Patent No.: US 12,139,946 B1
(45) Date of Patent: Nov. 12, 2024

(54) SLIDING DOOR

(71) Applicants: Ali Tavakoli Targhi, San Jose, CA (US); Nathan J. Raff, Tempe, AZ (US); Thuan D. Doan, Palo Alto, CA (US); Donald R. Monroe, Los Gatos, CA (US)

(72) Inventors: Ali Tavakoli Targhi, San Jose, CA (US); Nathan J. Raff, Tempe, AZ (US); Thuan D. Doan, Palo Alto, CA (US); Donald R. Monroe, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 273 days.

(21) Appl. No.: 17/864,993

(22) Filed: Jul. 14, 2022

Related U.S. Application Data

(60) Provisional application No. 63/242,911, filed on Sep. 10, 2021.

(51) Int. Cl.
*E05D 15/10* (2006.01)
*B60J 5/06* (2006.01)

(52) U.S. Cl.
CPC ............ *E05D 15/1081* (2013.01); *B60J 5/06* (2013.01); *E05D 2015/1089* (2013.01)

(58) Field of Classification Search
CPC . E05D 15/1081; E05D 2015/1089; B60J 5/06
See application file for complete search history.

(56) References Cited

U.S. PATENT DOCUMENTS

| 3,935,674 | A | * | 2/1976 | Williams | ............ E05D 15/1081 49/223 |
|---|---|---|---|---|---|
| 6,860,543 | B2 | | 3/2005 | George et al. | |
| 7,950,719 | B2 | | 5/2011 | Elliott et al. | |
| 2006/0059783 | A1 | | 3/2006 | Braun et al. | |
| 2009/0199480 | A1 | | 8/2009 | Ehrhard | |
| 2009/0230721 | A1 | | 9/2009 | Rusnak | |
| 2012/0193938 | A1 | | 8/2012 | Krajenke | |
| 2017/0089110 | A1 | * | 3/2017 | Tavakoli-Targhi | ........ B60J 5/06 |

FOREIGN PATENT DOCUMENTS

| DE | 4314115 A1 * | 11/1994 | ................ B60J 5/06 |
|---|---|---|---|
| DE | 102018128560 A1 | 5/2020 | |
| EP | 3446904 A1 | 2/2019 | |
| EP | 3501467 A1 | 6/2019 | |

* cited by examiner

*Primary Examiner* — Daniel J Colilla
(74) *Attorney, Agent, or Firm* — Young Basile Hanlon & MacFarlane, P.C.

(57) ABSTRACT

A door system for a passenger vehicle includes a door, a first movement stage, a second movement stage, a second movement stage, and a movement transfer system. The door includes inboard and outboard door panels, and an inner door structure disposed in a cavity defined between the inboard and outboard door panels. The first movement stage moves the door outboard and inboard to open and close an opening of a vehicle body. The second movement stage moves the door forward and backward relative to the opening. The movement transfer system mechanically links the first and second movement stages to cause simultaneous movement of the first and second movement stages. The first movement stage is coupled to and extends between the vehicle body and the second movement stage. The second movement stage is coupled to and extends between the first movement stage and an inner door.

7 Claims, 8 Drawing Sheets

SLIDING DOOR

CROSS-REFERENCE TO RELATED APPLICATIONS

This application claims the benefit of U.S. Provisional Application No. 63/242,911, filed on Sep. 10, 2021, the content of which is hereby incorporated by reference in its entirety for all purposes.

TECHNICAL FIELD

This disclosure relates to doors and, in particular, sliding doors for passenger vehicles.

BACKGROUND

Passenger vehicles may include one or more sliding doors that selectively open and close passenger compartments of the vehicle to allow for ingress and egress of passengers. Such passenger vehicles typically include one or more tracks in the vehicle body in which arms of the door slide. However, this arrangement may limit relative sizing and/or positioning of the sliding door relative to the vehicle body, as well as be unappealing aesthetically.

SUMMARY

Disclosed herein are implementations of doors, door systems, and vehicles comprising the same. In one implementation, a door system for a passenger vehicle includes a door, a first movement stage, a second movement stage, a second movement stage, and a movement transfer system. The door includes inboard and outboard door panels, and an inner door structure disposed in a cavity defined between the inboard and outboard door panels. The first movement stage moves the door outboard and inboard to open and close an opening of a vehicle body. The second movement stage moves the door forward and backward relative to the opening. The movement transfer system mechanically links the first and second movement stages to cause simultaneous movement of the first and second movement stages. The first movement stage is coupled to and extends between the vehicle body and the second movement stage. The second movement stage is coupled to and extends between the first movement stage and an inner door.

The first movement stage may include a parallelogram linkage that pivots the second movement stage and the door relative to the opening of the vehicle body. The first movement stage may be configured to initially move the door from a closed position outboard within five degrees of an outboard direction that is perpendicular to a forward direction of travel of the passenger vehicle. The first movement stage may have a range of motion that is greater than 90 degrees. The second movement stage may include a carriage that is coupled to and forms a link of the parallelogram linkage. The second movement stage may include a track coupled to the inner door structure of the door. The carriage may be configured to translate along the track to move the door forward and backward relative to the opening of the vehicle body. The parallelogram linkage and the track may be mechanically linked to cause the pivoting of the parallelogram linkage and the translation of the carriage to occur simultaneously.

In one implementation, a door system for a passenger vehicle includes a door, a rail system, a mount, and a cover. The door includes an outboard door panel, an inboard door panel, and an inner door structure arranged in a cavity defined between the outboard door panel and the inboard door panel. The inboard door panel defines an elongated opening to the cavity which extends in a fore-aft direction of the passenger vehicle. The rail system is positioned in the cavity and includes a track and a carriage. The track is coupled to the inner door structure of the door. The carriage is supported by and translatable along the track in the fore-aft direction as the door is moved between a closed position and an open position. The mount is coupled to and extends inboard from the carriage through the elongated opening. The mount is movable along the elongated opening in the fore-aft direction as the carriage translates along the track when the door is moved between the closed position and the open position. The cover closes the elongated opening when the door is in the closed position and translates along the elongated opening to open the elongated opening for the mount to extend therethrough as the door is moved between the closed position and the open position.

The door system may further include a cover track along which the cover translates. The cover track may extend along the elongated opening and curve outboard into the cavity around the track of the rail system. The cover may be flexible about an upright axis and rigid about a horizontal axis extending in a fore-aft direction of the passenger vehicle. The cover may include upright members that are pivotably coupled to adjacent ones of the upright members at upright pivot joints so as to be flexible about the upright axis. The cover may include a flexible sheet that is coupled to and extends over an inboard side of the upright members. When the door is in the closed position, a portion of the cover formed by multiple of the upright members may positioned in the elongated opening and is planar, and when the door is in the open position, the portion of the cover may be in the cavity and curved.

In one implementation, a vehicle includes a vehicle body and a door. The vehicle body defines a passenger compartment and an opening for passengers to enter into and exit from the passenger compartment. The door is movably coupled to the vehicle body and movable between a closed position in which the opening is closed by the door and an open position in which the opening is opened by the door. The door includes a mount, a carriage, and a track. The mount is movably coupled to the vehicle body. The carriage is coupled to the mount. The track supports the carriage to be movable therealong. The door is movable from the closed position in an outboard direction of the vehicle with the mount and in a fore-aft direction of the vehicle with the track and the carriage. Movement with the mount causes movement with the carriage.

DETAILED DESCRIPTION

Figure 1:
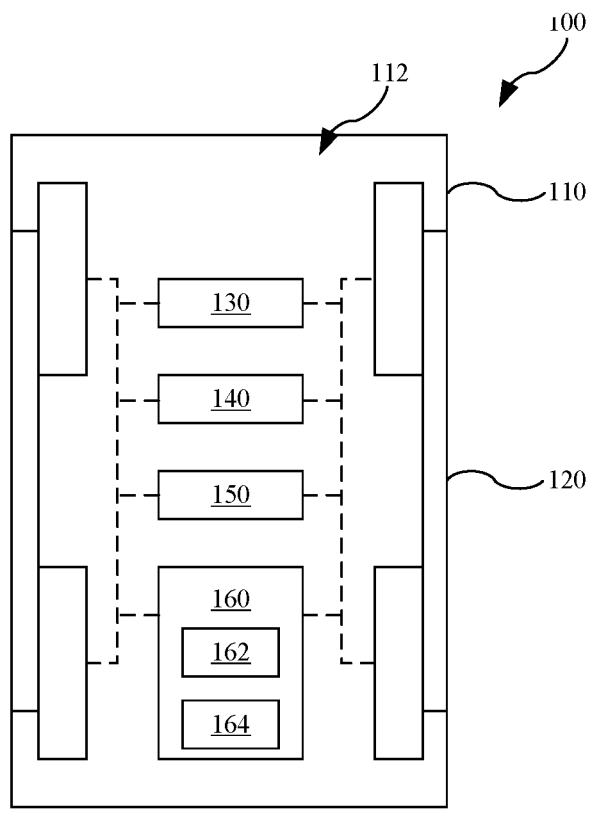
FIG. 1 is a schematic view of a vehicle.

Referring to FIG. 1, a vehicle 100 generally includes a vehicle body 110, a drive system 130, a steering system 140, a braking system 150, and a control system 160. The vehicle body 110 defines a passenger compartment 112 and includes doors 120 that are movable relative to the vehicle body 110 to open and close the passenger compartment 112 to allow ingress and egress of passengers.

The drive system 130 is operatively coupled to wheels 102 of the vehicle 100 to propel the vehicle 100 along a roadway. The drive system 130 may, for example, include one or more motors that are operated by a power source (e.g., a battery) and are operatively coupled to the wheels 102 via one or more gearboxes. The steering system 140 is operatively coupled to the wheels 102 to pivot the wheels 102 to steer the vehicle 100 (e.g., change lateral direction thereof) along the roadway. The steering system 140 may, for example, include a motor operated by the power source and operatively coupled to the wheels 102 via a steering rack (e.g., a rack and pinion system). The braking system 150 is operatively coupled to the wheels 102 to slow rotation thereof so as to slow the vehicle 100. The braking system 150 may, for example, include friction brakes (e.g., rotor and caliper) associated with each of the wheels 102. The control system 160 is configured to control operation of the drive system 130, the steering system 140, and the braking system 150, for example, with autonomous operation (e.g., operating the vehicle systems to reach a destination input by or otherwise associated with a passenger, such as home or work) and/or in conjunction with human operation. The control system 160 may, for example, include one or more controllers 162 and one or more sensors 164 that monitor the environment and/or the drive system 130, the steering system 140, and/or the braking system 150. The controller 162 may have an example hardware configuration as described below with respect to FIG. 2 or any other suitable hardware configuration. The sensors 164 may, for example, include radar, sonar, LIDAR, visible light or other types of sensors for monitoring the environment.

Figure 2:
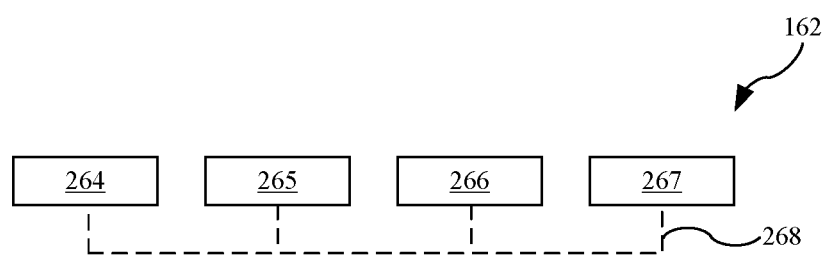
FIG. 2 is a schematic view of a controller of a control system of the vehicle of FIG. 1.
Figure 3:
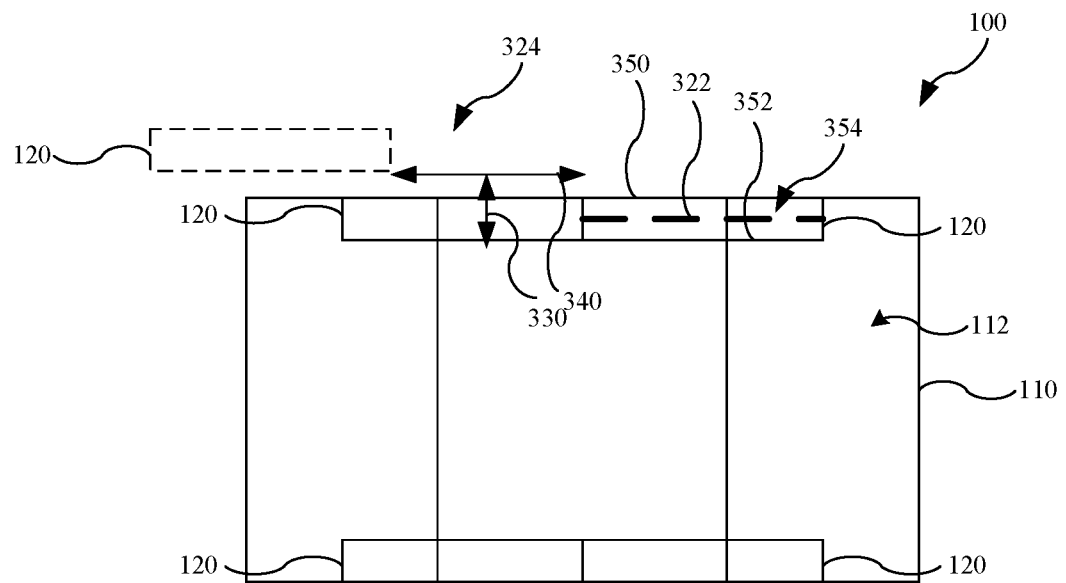
FIG. 3 is a top view of the vehicle of FIG. 1 illustrating doors thereof in closed positions.

Referring to FIG. 2, the controller 162 is a suitable computing system or device for controlling the various systems and components described herein and performing the various methods and operations described herein. In one non-limiting example, the controller 162 generally includes a processor 264, a memory 265, a storage 266, a communications interface 267, and a bus 268 by which the other components of the controller 162 are in communication with each other. The processor 264 may be any suitable processing device, such as a central processing unit (CPU), capable of executing instructions (e.g., software programming). The memory 265 is a volatile, high speed memory device or components, such as a random-access memory device (RAM). The storage 266 is a non-volatile storage device, such as a solid-state storage device or drive, capable of storing instructions (e.g., software programming) to be executed by the processor 264. The communications interface 267 is configured for signals to be transmitted from and/or received by the controller 162, for example, to and/from the sensors 164 and/or various components of the systems described herein (e.g., motors or other actuators).

Figure 4:
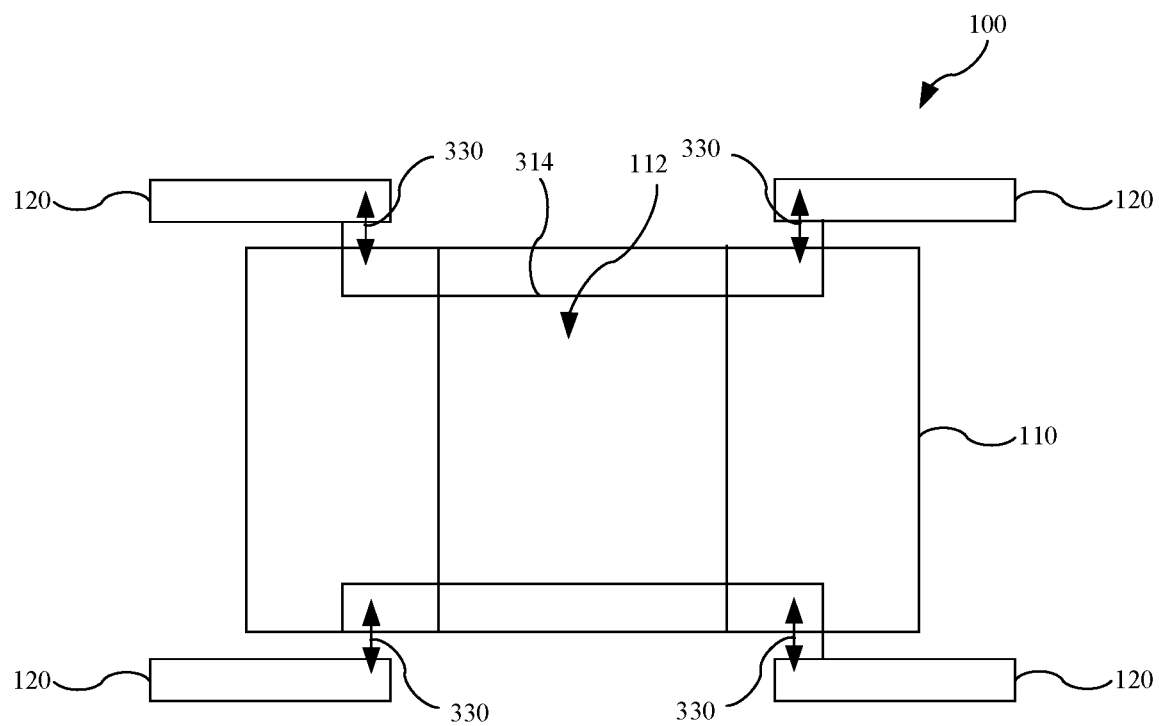
FIG. 4 is a top view of the vehicle of FIG. 1 illustrating the doors thereof in open positions.
Figure 5:
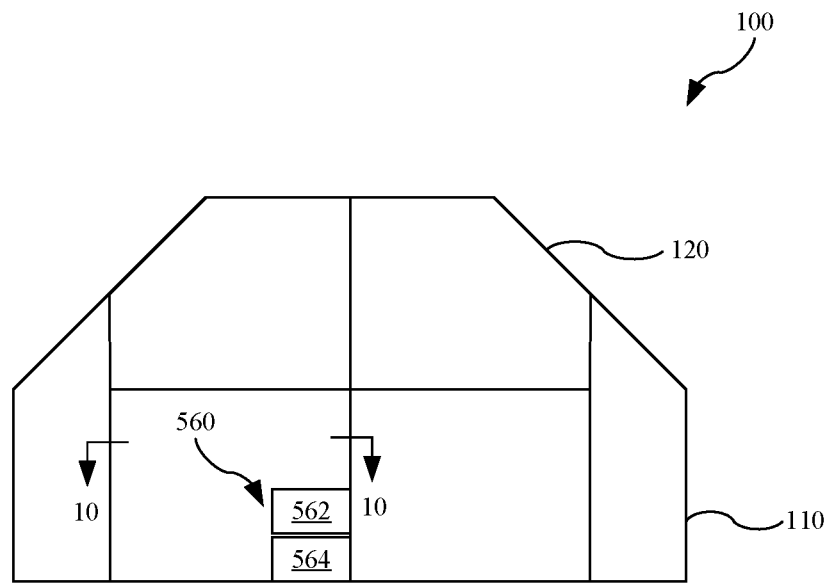
FIG. 5 is a side view of the vehicle of FIG. 1 illustrating the doors thereof in closed positions.
Figure 6:
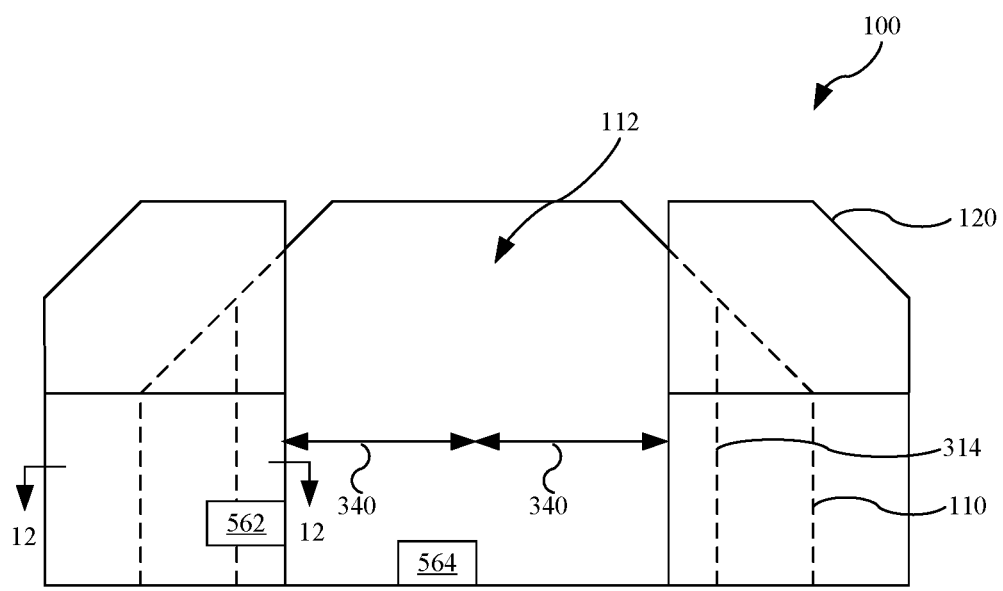
FIG. 6 is a side view of the vehicle of FIG. 1 illustrating the doors thereof in open positions.

Referring to FIGS. 3-6, the vehicle 100 includes the doors 120 (e.g., four as shown), which are configured to generally translate relative to the vehicle body 110 between closed positions (shown in FIGS. 3 and 5) and open positions (shown in FIGS. 4 and 6). In the closed position, the door 120 closes an opening 314 in the vehicle body 110 that provides access to the passenger compartment 112. In the open position, the door 120 is moved away from the opening 314 to allow passengers to enter and exit the passenger compartment 112 through the opening 314. As described in further detail below, the doors 120 generally include a door structure 322 (e.g., a frame or inner door structure; depicted schematically) and a door movement system 324 coupled to the door structure 322 and configured to move the door 120 relative to the vehicle body 110. The door movement system 324 generally includes a first movement stage 330 and a second movement stage 340 that are configured to support and move the door 120 relative to the vehicle body 110. The first movement stage 330 and the second movement stage 340 are depicted schematically in FIG. 3 for one of the doors 120 (e.g., the rear left door) but may be used with each of the four doors 120 that are shown. The first movement stage 330 and the second movement stage 340 are mechanical systems that are configured to move the door 120 in different degrees of freedom defined thereby. The door movement system 324 may further include suitable actuators, sensors, and/or a control system (e.g., which may be or include the controller 162 and/or the sensors 164 described above). As is shown for one of the doors 120 (i.e., the front left door), each of the doors 120 may further include one or more outboard door panels 350 that form an outer surface of the door 120, one or more inboard door panels 352 that form an inner surface of the door 120, and/or more or more fixed or movable (e.g., retractable window panels; not labeled). A door cavity 354 is defined by and between the outboard door panel 350 and the inboard door panel 352. The door structure 322 may be positioned in the door cavity 354. The door 120 and the door movement system 324 may be referred to cooperatively as a door system.

The first movement stage 330 is coupled to and extends between the vehicle body 110 and the second movement stage 340, while the second movement stage 340 is coupled to and extends between the first movement stage 330 and the door structure 322. The first movement stage 330 is configured to move the door 120 outboard and inboard (e.g., in an inboard-outboard direction; e.g., right and left) relative to the vehicle body 110. For example, the first movement stage 330 may be configured to pivot, translate, or slide the door 120 relative to the vehicle body 110 in the inboard-outboard direction. The second movement stage 340 is configured to move the door 120 forward and backward (e.g., in a fore-aft direction) relative to the vehicle body 110. For example, the second movement stage 340 may be configured to translate (e.g., slide) the door 120 relative to the vehicle body 110 forward and backward. Such movement of the door 120 via the second movement stage 340 may be substantially horizontal (e.g., within 10 degrees, 5 degrees, 3 degrees, or less from horizontal) and in the fore-aft direction (e.g., within 10 degrees, 5 degrees, 3 degrees, or less from the fore-aft direction). The forward, backward, and fore-aft direction are defined relative to a forward direction of travel of the vehicle 100. The outboard, inboard, and inboard-outboard directions are defined as generally normal to (e.g., within 10 degrees of being perpendicular to, or being perpendicular to) the forward direction of travel of the vehicle 100.

It should be noted, however, that the overall path of the door 120, which may include simultaneous movement via the first movement stage 330 and the second movement stage 340, may follow a curved or otherwise convoluted path. Movement of the door 120 via the first movement stage 330 and the second movement stage 340 may be mechanically independent such that movement of one does not cause movement of the other (e.g., having separate actuators associated with each of the first movement stage 330 and the second movement stage 340, a common actuator that is decouplable from each of the first movement stage 330 and the second movement stage 340, or a cam system that stages movement with the first movement stage 330 and the second movement stage 340) or may be mechanically linked such that movement of one of the movement stages 330, 340 causes simultaneous movement of the other of the movement stages 330, 340 (e.g., with gears, cams). The first movement stage 330 and the second movement stage 340, including various functions, mechanisms, and operations thereof, are discussed in further detail below.

Provision of the second movement stage 340 with the door 120 (e.g., being coupled thereto) to provide the primary for-aft movement of the door 120 stands in contravention and provides various advantages over conventional vehicle bodies with conventional sliding doors. As shown in FIGS. 4 and 6, providing the second movement stage 340 (e.g., a rail system 740 as discussed in further detail below) with the door 120, as opposed to the vehicle body 110, the doors 120 may extend fore or aft of the vehicle body when in the open position (see FIG. 4) and/or may extend above portions of the vehicle body 110 inwardly adjacent thereto (e.g., maximum height of the vehicle body at a corresponding fore-aft position). In contrast, conventional vehicle bodies typically include tracks along which the conventional sliding door slides, but this arrangement may dictate the shapes and/or movement of such conventional vehicle bodies and sliding doors relative to each other. For example, conventional sliding doors may not extend beyond (e.g., fore or aft) of the conventional vehicle body when in open positions, nor above inwardly adjacent portions of the conventional vehicle body when in open positions. Furthermore, the tracks are located on the exterior of the vehicle body and may be aesthetically unappealing or require integration into other features of the passenger vehicle (e.g., body lines, windows) to mask the appearance thereof.

Still referring to FIGS. 5 and 6, the vehicle 100 may additionally include one or more closure systems 560 that function to selectively retain the door 120 in the closed position. For example, after the door 120 is moved to the closed position by the door movement actuator, the closure system 560 mechanically couples the door 120 to the vehicle body 110 and/or another of the doors 120 in the closed position. The closure system 560 may, for example, include a latch 562 and a striker 564. The latch 562 is a selectively operated mechanism that is configured to releasably couple to the striker 564, the latch 562 being provided on the door 120 (as shown) or alternatively provided in the vehicle body 110. The striker 564 may be a fixed component that is provided on the other of the vehicle body 110 (as shown) or the door 120 and is configured to be received by the latch 562 to couple thereto. The latch 562 may be mechanically operated (e.g., by a user pulling a handle), electromechanically operated (e.g., by a user providing an input, such as a button press or a voice command, responsive to which the latch 562 is operated), or both (e.g., the latch 562 may be a cinching latch that cinches or releases the striker 564 upon receipt of the user input).

Figure 7:
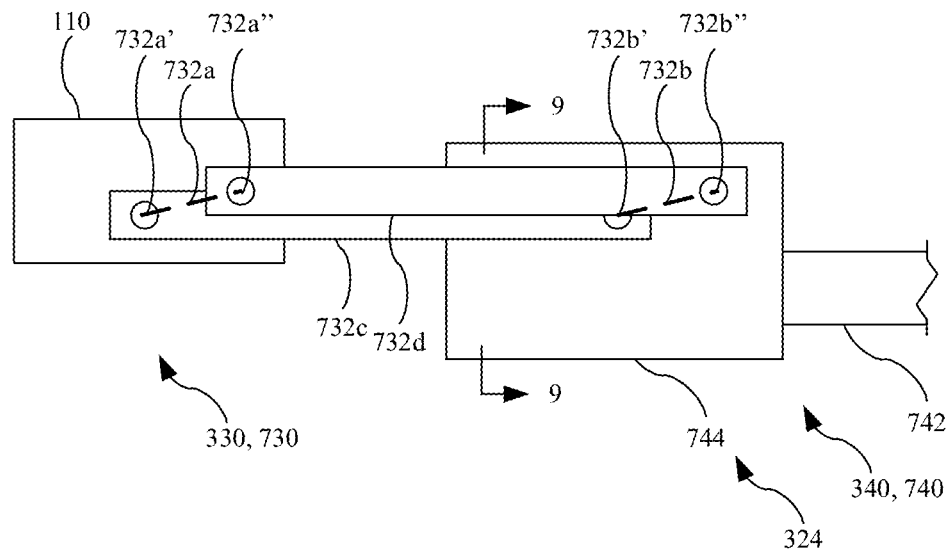
FIG. 7 is a partial top view of first and second movement stages of the door in a first configuration with various components depicted schematically.
Figure 8:
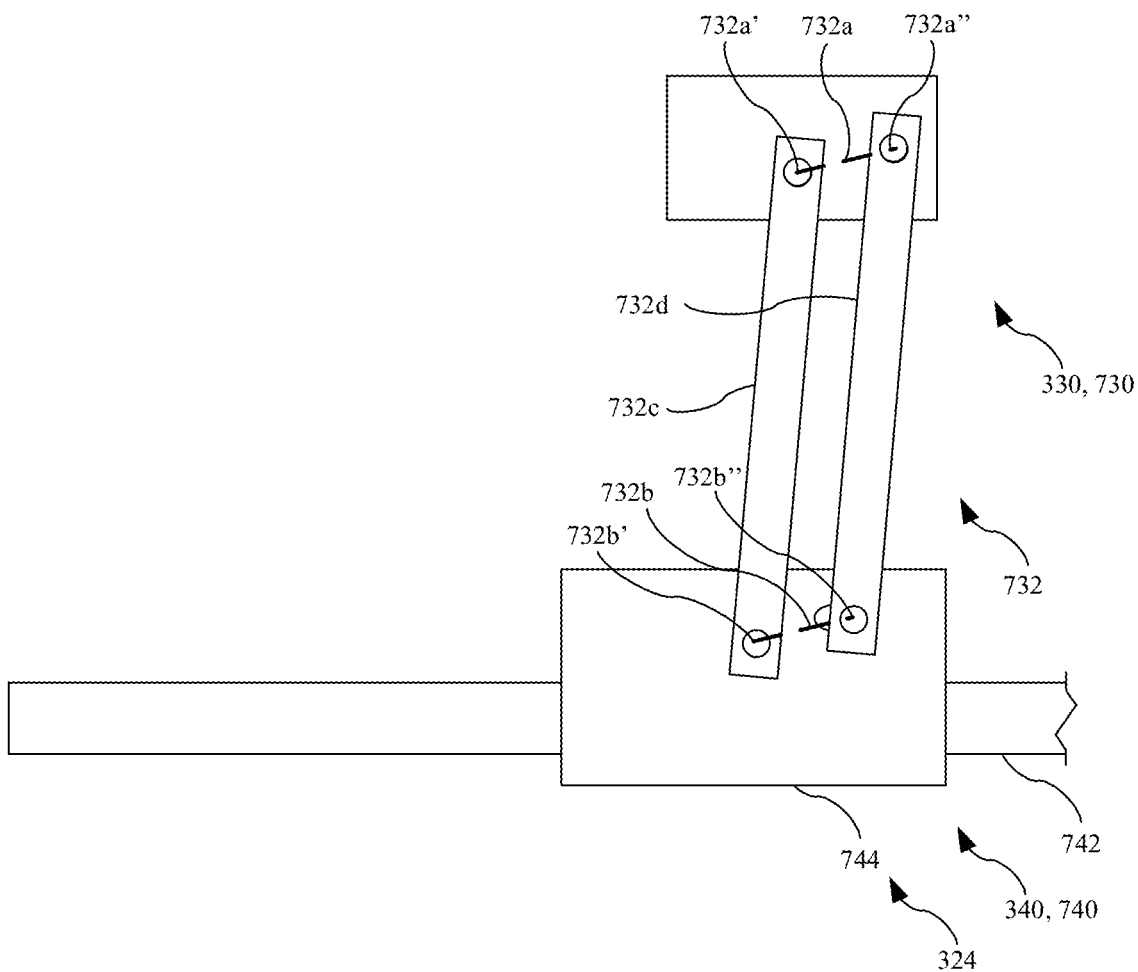
FIG. 8 is a partial top view of the view of the first and second movement stages of the door in a second configuration with various components depicted schematically.

Referring to FIGS. 7 and 8, the first movement stage 330 is configured as a mount 730 that includes a linkage 732, while the second movement stage 340 is configured as a rail system 740 that includes a track assembly 742 and a carriage 744. The linkage 732 is coupled to and extends between the vehicle body 110 and the carriage 744 and is configured to provide movement of the door 120 in the inboard-outboard direction relative to the vehicle body 110, for example, by pivoting the second movement stage 340 (e.g., the rail system 740) and the door 120 relative to the opening 314 of the vehicle body 110. The track assembly 742 is fixedly coupled to the door 120, while the carriage 744 is supported by and movable along the track assembly 742 to, thereby, move the door 120 in the fore-aft direction relative to the vehicle body 110. The track assembly 742 may be considered to define, include, or referred to as a track.

The linkage 732 of the mount 730 may, for example, be a four-bar linkage that generally includes a first link 732*a* (illustrated schematically with a heavy weight dashed line) fixedly coupled to or otherwise formed by the vehicle body 110 (e.g., a base, ground, fixed, or frame link), a second link 732*b* (illustrated schematically with a heavy weight dashed line) fixedly coupled to or formed by the carriage 744 (e.g., a coupler or floating link), and a third link 732*c* and a fourth link 732*d* (e.g., crank links) that extend between the first link 732*a* and the second link 732*b*. The first link 732*a* defines first and second pivots 732*a*', 732*a*" that are located on the vehicle body 110. The first and second pivots 732*a*', 732*a*" are coupled to and about which rotate proximal ends (not labeled) of the third link 732*c* and the fourth link 732*d*, respectively. The second link 732*b* defines third and fourth pivots 732*b*', 732*b*" that are fixedly located on the carriage 744. The third and fourth pivots 732*b*', 732*b*" are coupled and about which rotate distal ends (not labeled) of the third link 732*c* and the fourth link 732*d*, respectively. The linkage 732 may be configured for the door 120 to be substantially parallel with itself between the open and closed positions, for example, being configured as a parallelogram linkage with the first link 732*a* and the second link 732*b* being substantially the same length as each other (e.g., a first length measured between the first and second pivots and between the third and fourth pivots) and the third link 732*c* and the fourth link 732*d* being substantially the same length as each other (e.g., a second length measured between the first and third pivots and between the second and fourth pivots). It should be noted that, while the third link 732*c* and the fourth link 732*d* are each illustrated as being substantially straight between the first and third pivots and the second and fourth pivots, respectively, the third link 732c and the fourth link 732d may instead follow a convoluted path therebetween.

Figure 9:
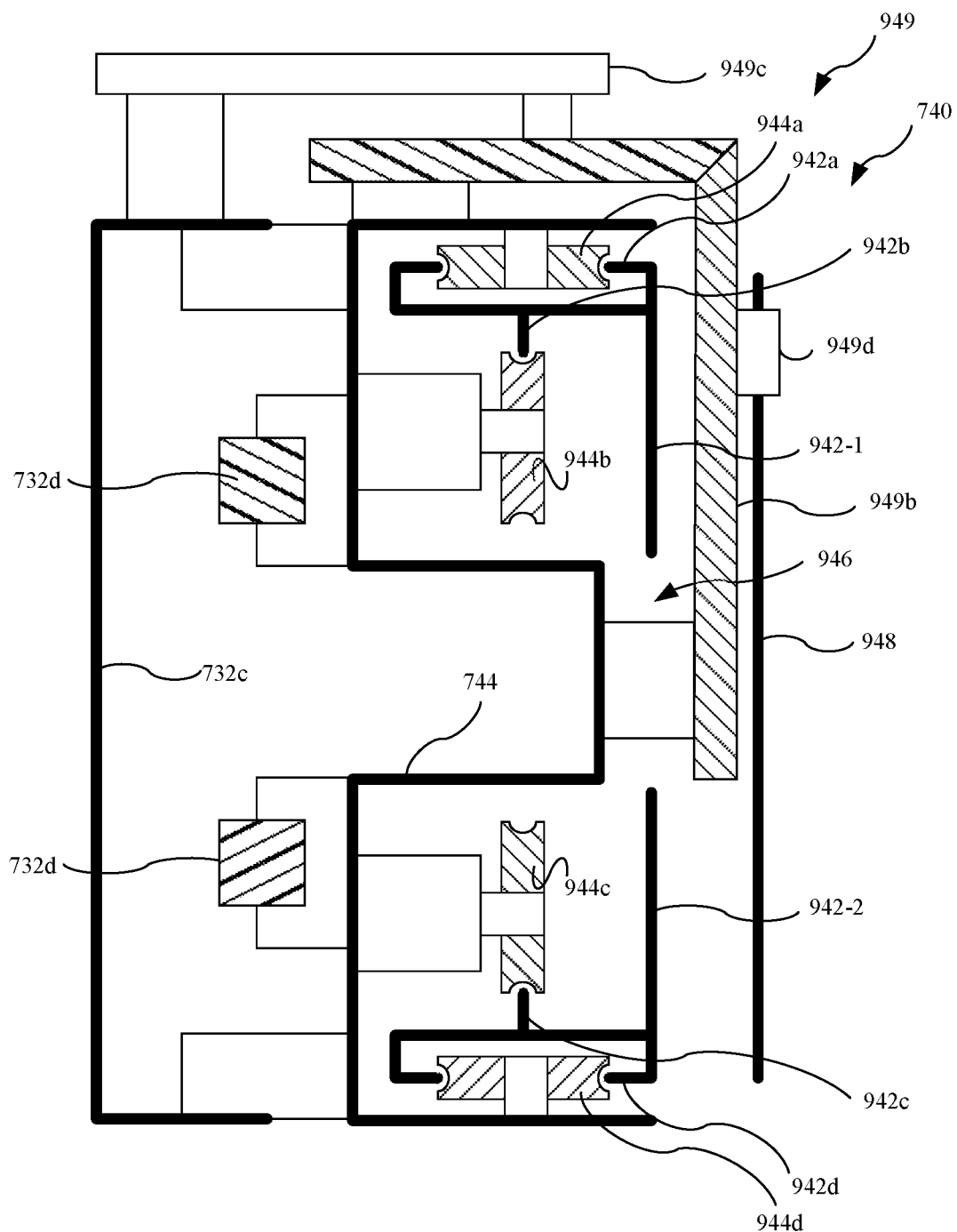
FIG. 9 is a cross-sectional view of the first and second movement stages in the first configuration.
Figure 10:
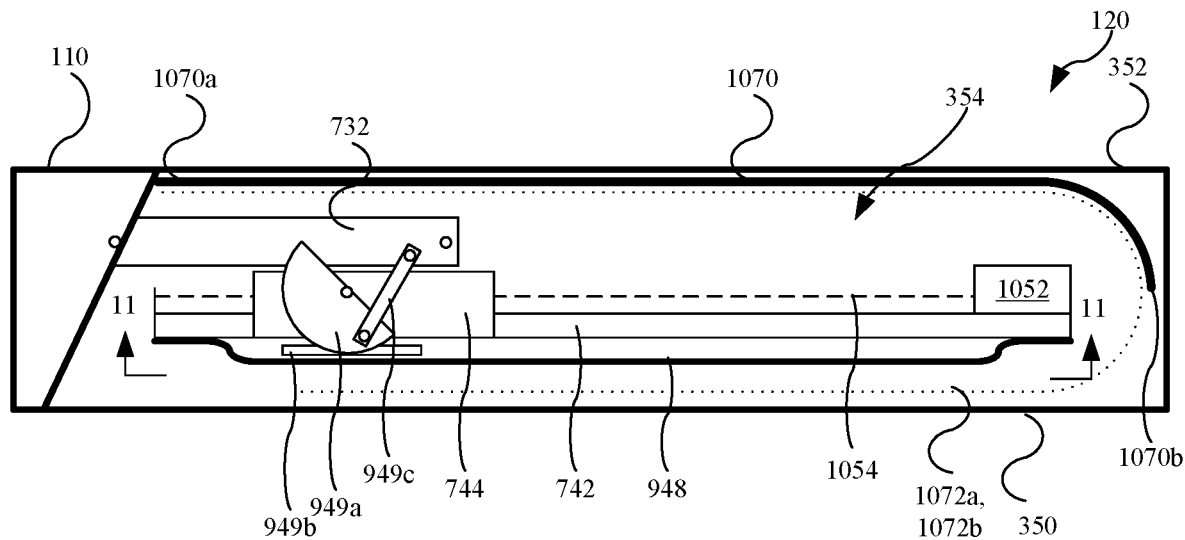
FIG. 10 is a partial top cross-sectional view taken along line 10-10 in FIG. 5 illustrating the first and second movement stages and a movement transfer system within the door in the first configuration.
Figure 11:
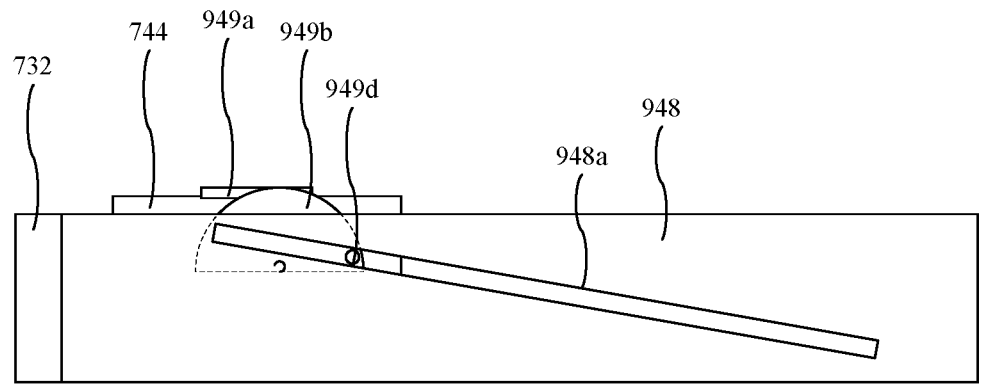
FIG. 11 is a partial side cross-sectional view taken along line 11-11 in FIG. 10 illustrating the first and second movement stage and the movement transfer system in the first configuration.
Figure 12:
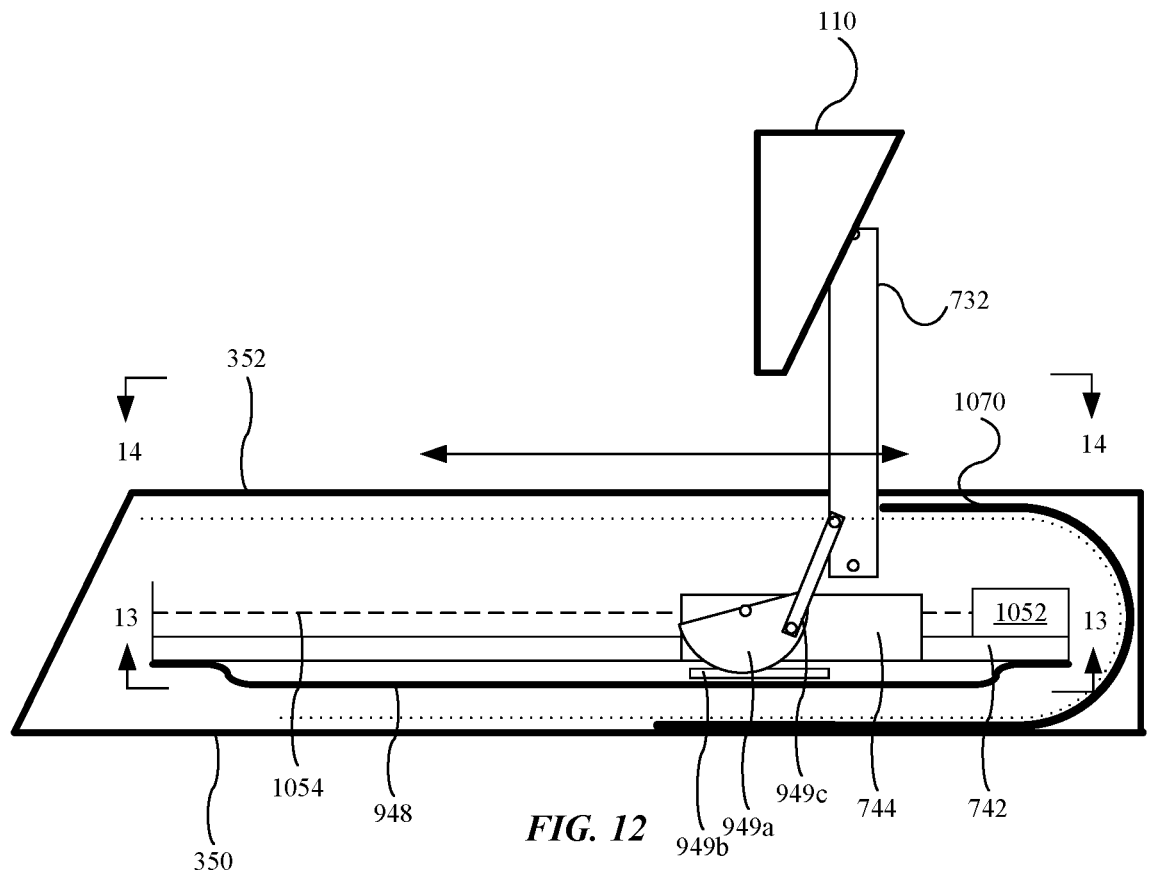
FIG. 12 is a partial top cross-sectional view taken along line 12-12 in FIG. 6 illustrating the first and second movement stages and a movement transfer system within the door in the first configuration.
Figure 13:
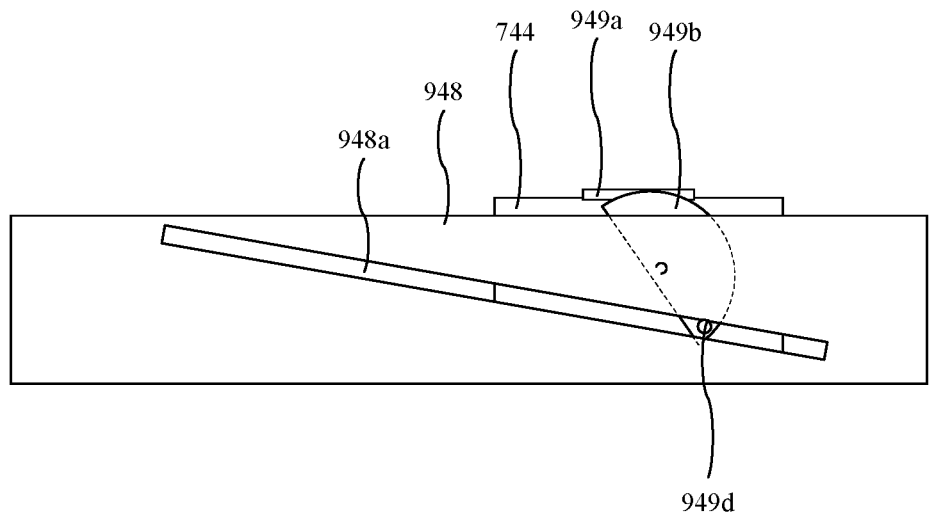
FIG. 13 is a partial side cross-sectional view taken along line 13-13 in FIG. 12 illustrating the first and second movement stage and the movement transfer system in the first configuration.

The pivots 732a', 732a", 732b', 732b" define axes about which the third link 732c and the fourth link 732d rotate. The pivots 732a', 732a", 732b' 732b" may be further configured to prevent tilting of the carriage 744 relative to the vehicle body 110 about horizontal axes (e.g., roll and/or pitch directions). For example, the pivots 732a', 732a", 732b', 732b" may be vertically elongated (e.g., including an elongated bushing or bearing) and/or may include two spaced apart hinges (e.g., each hinge including a bushing or bearing). In the case of a pivot including two spaced apart hinges, one of the links may be received within the other of the links (e.g., being nesting links). For example, as shown in FIG. 9, the first pivot 732a' on the carriage 744 (as shown) and the second pivot 732a" on the vehicle body 110 include spaced apart hinges (represented by upper and lower blocks on the carriage 744), while the fourth link 732d (configured as two separate upper and lower members) is received within the third link 732c (e.g., itself including spaced apart members or portions, such as being generally C-shaped) in the closed position.

The linkage 732 is configured to initially move the door 120 from the closed position substantially in the outboard direction (e.g., within 15 degrees, 10 degrees, 5 degrees or less of the outboard direction). The linkage 732 may be further configured to have a range of motion that prevents or limits any inboard movement at an end of travel away from the closed position, for example, by having a range of travel of 115 degrees, 105 degrees, 95 degrees, or less (e.g., approximately 95 degrees, as shown between FIGS. 7 and 8). The linkage 732 may have a range of motion that is greater than 90 degrees (e.g., between 90 degrees and 115 degrees).

As alternatives to the first movement stage 330 being configured as a mount 730 with a linkage 732, the first movement stage 330 may instead be configured as another mechanism that provides movement in an outboard direction, such as a linear movement stage (e.g., carriage sliding on one or more rails, telescoping mechanism) or other type of pivoting movement stage (e.g., linkage rotating about horizontal axes).

The rail system 740, as referenced above, includes the track assembly 742 and the carriage 744 that is supported thereby and translates (e.g., slides) therealong. The track assembly 742 and the carriage 744 are further configured to constrain relative movement between the track assembly 742 and the carriage 744 to a single degree of freedom, which is a path defined by the track assembly 742 and along which the carriage 744 slides. For example, the track assembly 742 and the carriage 744 may be cooperatively configured to prevent relative movement therebetween, including in directions of vertical translation, lateral translation in the inboard-outboard direction, and rotation about roll, pitch, and yaw axes of the vehicle 100.

The track assembly 742, for example, includes one or more tracks that are elongated and extend parallel with each other (e.g., in a straight line or other path substantially in the fore-aft direction). The track assembly 742 is fixedly coupled to the door structure 322 of the door 120. The carriage 744 includes rollers (e.g., wheels or bearings) that movably engage the one or more tracks of the track assembly 742 to slidably support the carriage 744 thereon. The carriage 744 is fixedly coupled to or forms the second link 732b of the linkage 732.

Referring to FIG. 9, in one example, the track assembly 742 defines an upper horizontal track 942a, an upper vertical track 942b, a lower vertical track 942c, and a lower horizontal track 942d. The carriage 744 includes upper horizontal rollers 944a (e.g., two; one visible in FIG. 9) that are spaced apart from each other in the fore-aft direction and engage the upper horizontal track 942a of the track assembly 742 in a substantially horizontal direction, so as to substantially prevent (or limit) lateral movement in the inboard-outboard direction between the track assembly 742 and the carriage 744. The upper horizontal track 942a may, for example, include opposed track surfaces that define a gap into which the upper horizontal rollers 944a are positioned, while the upper horizontal rollers 944a may include a circumferential surface that is U-shaped in cross-section so as to receive the opposed track surfaces therein. The horizontal engagement of the upper horizontal rollers 944a with the opposed track surfaces of the upper horizontal track 942a may prevent relative movement between the track assembly 742 and the carriage 744 in the inboard-outboard direction. Moreover, the fore-aft spacing of the upper horizontal rollers 944a and resultant spaced apart horizontal engagement of the upper horizontal rollers 944a may prevent rotation of the carriage 744 relative to the track assembly 742 about a vertical axis (e.g., a yaw axis).

The carriage 744 includes upper vertical rollers 944b (e.g., two; one visible in FIG. 9) that are spaced apart from each other in the fore-aft direction and engage the upper vertical track 942b of the track assembly 742 in a substantially vertical direction, so as to prevent relative vertical movement between the track assembly 742 and the carriage 744. The upper vertical track 942b may, for example, include a downwardly-extending track surface (as shown) that engages the upper vertical rollers 944b. Alternatively, the upper vertical track 942b may include opposed track surfaces that define a gap into which the upper vertical rollers 944b are positioned, with a lower track surface supporting the carriage 744 vertically on the track assembly 742. The upper vertical rollers 944b may include a circumferential surface that is U-shaped in cross-section so as to receive the track surfaces therein. The vertical engagement of the upper vertical rollers 944b may prevent relative movement between the track assembly 742 and the carriage 744 in the vertical direction. Moreover, the fore-aft spacing of the upper vertical rollers 944b and the resultant spaced-apart horizontal engagement of the upper vertical rollers 944b may prevent rotation of the carriage 744 relative to the track assembly 742 about an inboard-outboard axis (e.g., a pitch axis).

The lower vertical track 942c and the lower horizontal track 942d may be configured in the same manner as described above for the upper vertical track 942b and the upper horizontal track 942a, respectively, albeit positioned therebelow and with the lower vertical track 942c forming a lower surface that supports the carriage 744 thereon.

The carriage 744 may include lower vertical rollers 944c (e.g., two; one visible in FIG. 9) that are spaced vertically apart from the upper vertical rollers 944b and from each other in the fore-aft direction. The vertical and horizontal spacing of the upper vertical rollers 944b (upwardly engaging the upper vertical track 942b) and the lower vertical rollers (downwardly engaging the lower vertical track 942c) support the carriage 744 on the track assembly 742 and prevent rotation about a pitch axis of the vehicle 100.

The carriage 744 may also include lower horizontal rollers 944d (e.g., two; one visible in FIG. 9) that are spaced vertically apart from the upper horizontal rollers 944a and from each other in the fore-aft direction. The lower horizontal rollers 944d may additionally be positioned between and horizontally engage the opposed track surfaces of the lower horizontal track 942d. The vertical spacing and engagement of the upper horizontal rollers 944a and the lower horizontal rollers 944d with the upper horizontal track 942a and the lower horizontal track 942d may prevent relative rotation between the track assembly 742 and the carriage 744 about a fore-aft axis (e.g., a roll axis).

The upper horizontal track 942a and the upper vertical track 942b may each be provided be as a unitary track structure, such as an upper track structure 942-1 (e.g., an extruded and/or machined member of metal, polymer, or combinations thereof), or alternatively may be formed as one or more separate structures that are coupled together. The lower vertical track 942c and the lower horizontal track 942d may be formed in the same manner as the upper horizontal track 942a and the upper vertical track 942b, for example, being formed as a lower track structure 942-2 (e.g., being another unitary track structure) that may in turn be coupled to the upper track structure 942-1 and extend in parallel therewith. In one example, the upper track structure 942-1 and the lower track structure 942-2 are coupled to each other to define a substantially uniform gap 946 therebetween that extends along a fore-aft length of the track assembly 742. As discussed in further detail below, the upper track structure 942-1 and the lower track structure 942-2 may be coupled to an outer track structure 948.

The track assembly 742 is coupled to the door 120 and in particular to the door structure 322 or another interior structure thereof. The track assembly 742 may be positioned vertically near a center of gravity of the door 120 (e.g., within 20 percent, 10 percent, or less of an overall height of the door 120), so as to reduce the moment of inertia of the door 120 about the track assembly 742.

While one particular arrangement of the track assembly 742 and the carriage 744 is described (e.g., the track and roller arrangements), it should be understood that any other track and roller configuration may be utilized that functions to constrain movement of the carriage 744 relative to the track assembly 742 to one degree of freedom by permitting movement in that one degree of freedom (i.e., along the track), while preventing relative movement therebetween in directions normal to the degree of freedom and in rotational directions relative thereto.

As referenced above, movement of the door 120 by the first movement stage 330 (e.g., the mount 730 and the linkage 732 thereof) and the second movement stage 340 (e.g., the rail system 740) may be mechanically linked, such that movement by one of the movement stages causes movement by the other stage over at least a portion of the range of travel thereof. For example, the carriage 744 may include a movement transfer system 949 that mechanically links the first movement stage 330 and the second movement stage 340 to cause simultaneous movement thereof, such as by causing movement about the linkage 732 from movement of the carriage 744 along the track assembly 742 and that further causes movement of the carriage 744 along the track assembly 742 from movement about the linkage 732 (e.g., the pivoting of the linkage 732 is mechanically linked to translation of the carriage 744 on the track assembly 742). In one example, the movement transfer system 949 includes a first gear 949a and a second gear 949b that are enmeshed with and cause rotation of each other (e.g., bevel gears having teeth that engage each other and transfer force therebetween).

The first gear 949a is coupled to and rotates relative to (e.g., is pivotably coupled) the carriage 744 about a fixed axis (e.g., a vertical or upright axis) and is operatively coupled to the linkage 732 to transfer force and cause relative movement therebetween. In particular, the first gear 949a is operatively coupled to one of the third link 732c or the fourth link 732d (e.g., one of the crank links) via a transfer link 949c. The transfer link 949c is rotatably coupled at one end to an intermediate portion of the first gear 949a (i.e., between the fixed axis and the gear teeth) and at another end to one of the crank links of the linkage 732 (e.g., one of the third link 732c or the fourth link 732d) outward of the corresponding pivot on the carriage 744 (e.g., one of the pivots 732b', 732b"). The transfer link 949c, thereby, transfers force between and causes the first gear 949a and the linkage 732 to rotate relative to the carriage 744 in a fixed manner (i.e., each position of the first gear 949a relative to the carriage 744 corresponds to only one position of the linkage 732 relative to the carriage 744). As such rotation of the first gear 949a causes or is the result of inboard-outboard motion of the carriage 744 and the door 120 relative to the vehicle body 110.

The second gear 949b is coupled to and rotates relative to (e.g., is pivotably coupled to) the carriage 744 about another fixed axis (e.g., a horizontal axis that extends through the uniform gap 946 between the upper track structure 942-1 and the lower track structure 942-2 of the track assembly 742) and is operatively coupled to the track assembly 742 to transfer force and cause relative movement therebetween (e.g., to a cam slot thereof, as described below). The second gear 949b is operatively connected to the track assembly 742. The first gear 949a and the second gear 949b transfer force between each other and, thereby, between the linkage 732 and the track assembly 742 to cause the pivoting of the linkage 732 and the translation of the carriage 744 to occur simultaneously.

More particularly, the second gear 949b includes a cam follower 949d that slides within a cam slot 948a of the track assembly 742 and, in particular, of the outer track structure 948. The cam slot 948a extends along the track assembly 742 and varies in height, such that an upper surface of the cam slot 948a engages and applies a downward force to the cam follower 949d and a lower surface of the cam slot 948a engages and applies an upward force to the cam follower 949d. The cam follower 949d and the cam slot 948a thereby engage each other to transfer force between the second gear 949b and the track assembly 742 and cause the second gear 949b to move relative to the track assembly 742 in a fixed manner (i.e., that each rotational position of the second gear 949b relative to the carriage 744 corresponds to only one translational position of the carriage 744 relative to the track assembly 742, for example, with the cam slot 948a continuously changing in height over the fore-aft length thereof). Alternatively, the cam slot 948a may include a flat region with a constant height extending parallel with the tracks (e.g., 942a), such that translational movement over the flat region does not cause and prevents rotational movement of the second gear 949b and, thereby, the does not cause and prevents movement of the first gear 949a and the linkage 732.

The cam slot 948a may be formed in an outer track structure 948 that is coupled to the track assembly 742 and positioned outward of the carriage 744. For example, the outer track structure 948 may run parallel with the track assembly 742 and define a slot therebetween in which the second gear 949b is positioned and may move relative to the track assembly 742 and the outer track structure 948 coupled thereto. The outer track structure 948 may also couple the upper track structure 942-1 and the lower track structure 942-2 to each other to form the track assembly 742 and/or cooperatively form the track assembly 742 therewith. The outer track structure 948 may be formed of any suitable material according to any suitable manufacturing process, such being a cast, stamped, and/or machined metal or polymer material (e.g., aluminum, nylon).

In a further example, the movement transfer system 949 may be configured to selectively mechanically link the first movement stage 330 (e.g., the linkage 732) and the second movement stage 340 (e.g., the rail system 740). For example, the movement transfer system 949 may be configured to disengage the first gear 949a with the second gear 949b (e.g., by moving one axially from the other, or with use of a clutch mechanism such that torque is not transferred to the linkage 732). In still further examples, the first movement stage 330 and the second movement stage 340 are not mechanically linked and instead independently actuated (e.g., with separate actuators).

The vehicle 100 additionally includes one or more door movement actuators that cause the door 120 to move relative to the vehicle body 110 via the first movement stage 330 (e.g., the linkage 732) and the second movement stage 340 (e.g., the rail system 740). In one embodiment, the door movement actuator includes an electric motor 1052 and one or more cables 1054. The electric motor 1052 functions to transfer force via the cable 1054 between the carriage 744 and the door 120 (e.g., the door structure 322) or another component fixedly couple ed thereto (e.g., the track assembly 742). Due to the mechanical linking of the linkage 732 and the rail system 740 with the movement transfer system 949, the door movement actuator further causes the door 120 to move outward relative to the vehicle body 110 via the linkage 732. Alternatively, the one or more door movement actuator may be a linear actuator (e.g., lead screw or ball screw) or wheel or gear that engages the track assembly 742 to drive the carriage 744 therealong.

In the case of the first movement stage 330 (e.g., the linkage 732) and the second movement stage 340 (e.g., the rail system 740) not being mechanically linked, the vehicle 100 includes one door movement actuator associated with each one of the movement stages. For example, with the first movement stage 330 being configured with the linkage 732, one of the door movement actuators may include an electric motor and gears that function to transfer torque from the electric motor to the linkage 732 to cause rotational movement thereof, or if instead configured as a linear movement stage instead including a linear actuator (e.g., lead screw, ball screw, etc. operative by an electric motor). With the second movement stage 340 being configured as a rail system, the door movement actuator may be configured as described previously (e.g., a motor and cable, lead screw, ball screw, or wheel or gear that is driven and engages the track assembly 742).

Figure 14:
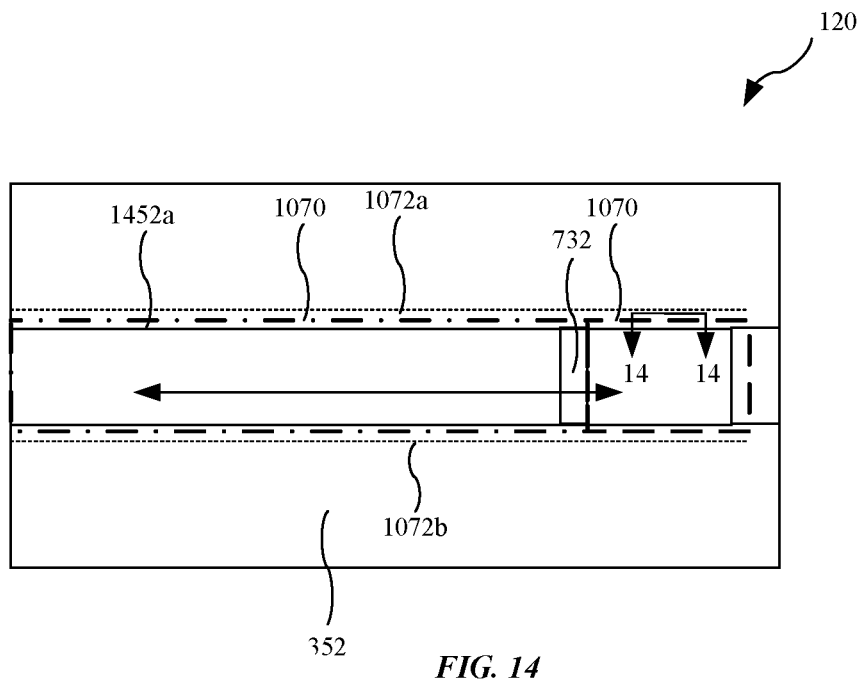
FIG. 14 is a partial cross-sectional view taken along line 14-14 in FIG. 12.

Referring additionally to FIG. 14, when the door 120 in the open position and moving between the open and closed positions, the linkage 732 extends generally inboard from the carriage 744 and through the inboard door panel 352 of the door 120. The inboard door panel 352 defines an elongated opening 1452a through which the mount 730 (e.g., the linkage 732) extends as the door 120 and the track assembly 742 move translationally relative to the carriage 744 and, thereby, the linkage 732 as the door 120 is moved between the open and closed positions. The elongated opening 1452a is defined between a lower edge of an upper portion of the inboard door panel 352 and an upper edge of a lower portion of the inboard door panel 352 (or trim components coupled thereto). The elongated opening 1452a is elongated in the fore-aft direction.

The elongated opening 1452a may be closed by a flexible cover 1070 that covers the track assembly 742 and other interior components of the door 120 from view in both the closed and open positions of the door 120. The flexible cover 1070 may, for example, be configured to be in an extended position (depicted in dash-dot lines in FIG. 14) when the door 120 is in the closed position and in a retracted position (depicted in dash-dash lines in FIG. 14) when the door 120 is in the open position. As the door 120 is moved between the closed and open positions, the flexible cover 1070 translates (e.g., slides) relative to the inboard door panel 352 in the fore-aft direction (as indicated by the bi-directional arrows), for example, within or otherwise supported by a cover track (e.g., having an upper cover track 1072a and a lower cover track 1072b). For example, the flexible cover 1070 may be considered to have a proximal end 1070a that may be maintained in substantially constant position relative to the carriage 744 and/or a distal end 1070b positioned inside the door cavity 354 of the door 120 between the outboard door panel 350 and the inboard door panel 352. As the door 120 is moved from the closed position to the open position, the carriage 744 is moved relative to the inboard door panel 352, the flexible cover 1070 slides along the upper and lower cover tracks 1072a, 1072b, and an intermediate portion of the flexible cover 1070 (between the proximal end 1070a and the distal end 1070b) is moved into the door cavity 354 of the door 120, for example, along the upper and lower cover tracks 1072a, 1072b that extend along the elongated opening 1452a and curve and extend outboard into the door cavity 354 (e.g., around the track assembly 742). As shown in FIG. 14, upper and lower edges of the flexible cover 1070 and/or the upper and lower cover tracks 1072a, 1072b may be positioned, respectively, above and below the lower and upper edges of the inboard door panel 352 that define the elongated opening 1452a, so as to be hidden from view.

Figure 15:
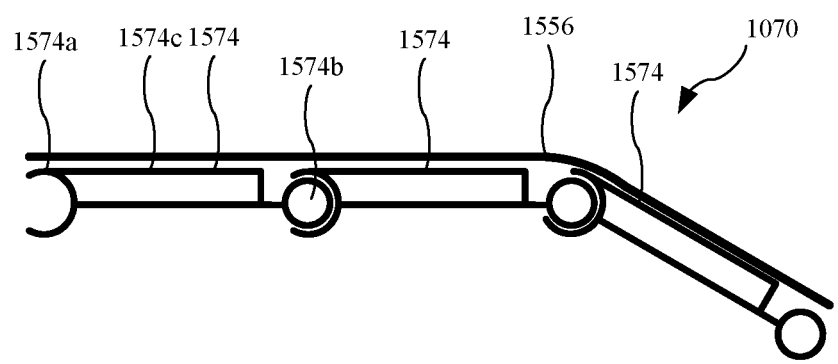
FIG. 15 is a partial cross-sectional view of a cover taken along line 15-15 in FIG. 14.

The flexible cover 1070 is configured to be flexible about a generally upright axis (e.g., vertical), while being substantially more rigid about a horizontal axis (e.g., to resist bending between the upper and lower cover tracks 1072a, 1072b). Referring to FIG. 15, in one example, the flexible cover 1070 includes a series of upright members 1574 that are each vertically elongated (i.e., having a height that is substantially greater than a width, such as five, ten, or more times greater) and are pivotably coupled to each adjacent one of the upright members 1574. The upright members 1574 are individually and cooperatively generally rigid against bending (e.g., to outboard forces applied to the flexible cover 1070 between upper and lower cover tracks 1072a, 1072b), while being cooperatively flexible about the upright pivot joints formed therebetween. Each of the upright members 1574 may have a generally constant width, such that the upright pivot joints formed therebetween are parallel with each other. While three of the upright members 1574 are illustrated in FIG. 15, it should be understood that the flexible cover 1070 may include any suitable number of the upright members 1574, such as eight, ten, twelve, fifteen, twenty, thirty, or more of the upright members 1574.

In one example, the upright members 1574 each include proximal end 1574a (e.g., nearer the carriage 744) and a distal end 1574b (e.g., further from the carriage 744) that form the flexible (e.g., pivot) joint therebetween. For example, the proximal end 1574a may form a male portion (e.g., a substantially circular portion with an upright or vertical axis) and the distal end 1574b may form a female portion (e.g., a C-shaped portion) that receives the male portion of the adjacent one of the upright members 1574. The female portion and the male portion may also be referred to, respectively, as a female end and a male end. The upright members 1574 may include planar portions 1574c that extend between the proximal ends 1574a and the distal ends 1574b thereof. The upright members 1574 are configured such that a portion of the flexible cover 1070 (e.g., formed by multiple of the upright members 1574) is planar when positioned in the elongated opening and that same portion is curved when positioned in the cavity.

The flexible cover 1070 may further include a flexible sheet 1556 that is coupled to an inboard side of the upright members 1574 and covers the upright members 1574 from view from inside the passenger compartment 112. The flexible sheet 1556 may, for example, be a single- or multi-layer textile and/or extruded polymer (e.g., an elastomer) which may be elastic (e.g., so as to stretch around the upright pivot joints between the upright members 1574 as the flexible cover 1070 travels around the upper and lower cover tracks 1072a, 1072b). The flexible sheet 1556 may be coupled to the upright members 1574 in any suitable manner. In one example, the flexible sheet 1556 includes (e.g., is coupled to) hooks 1556a at upper and lower ends thereof that are configured to hook around upper and lower edges, respectively, of the upright members 1574. Instead or additionally, the flexible sheet 1556 may be adhered to the planar portions 1574c of the upright members 1574, while not being adhered to the proximal ends 1574a and the distal ends 1574b thereof so as to allow relative movement (e.g., expansion) between the flexible sheet 1556 and the upright members 1574 at the pivot joint formed therebetween. In alternative configurations, the upright pivot joints may be formed in other manners, for example, with living joints between adjacent ones of the upright members 1574 (e.g., thinned portions of the material that continuously formed the upright members 1574) and/or by the flexible sheet 1556.

In an alternative configuration, the door movement system 324 may extend from the door 120 to the vehicle body 110 through a bottom portion of the door 120. In such case, the door 120 defines a lower opening (e.g., below the inboard door panel 352 instead of the elongated opening 1452a within the inboard door panel 352). For example, the first movement stage 330 may be coupled to a lower portion of the vehicle body 110 that defines the opening 314, such as a pillar structure (e.g., an upright structure) or a sill structure (e.g., horizontally elongated structure). In such case, the door 120 may include a bottom opening between the outboard door panel 350 and the inboard door panel 352 through which a structure of the door movement system 324 extends, such as a member coupled to and extending between or otherwise forming the linkage 732 (or another outboard actuator, such as a linear actuator) or the carriage 744.

As described above, one aspect of the present technology is the gathering and use of data available from various sources for passenger transport. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to transport person or objects between desired locations or destinations. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, with passenger transport, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, destinations may be determined based on non-personal information data or a bare minimum amount of personal information, such as the content being requested by the device associated with a user, other non-personal information, or publicly available information.

What is claimed is:

1. A door system for a passenger vehicle comprising:
a door having an outboard door panel, an inboard door panel, and an inner door structure disposed in a cavity defined between the outboard door panel and the inboard door panel;
a first movement stage that moves the door outboard and inboard to open and close an opening of a vehicle body of the passenger vehicle; and
a second movement stage that moves the door forward and backward relative to the opening of the vehicle body; and
a movement transfer system that mechanically links the first movement stage and the second movement stage to cause simultaneous movement of the first movement stage and the second movement stage,
wherein the first movement stage is coupled to and extends between the vehicle body and the second movement stage, and the second movement stage is coupled to and extends between the first movement stage and the inner door structure of the door,
wherein the first movement stage includes a parallelogram linkage that pivots the second movement stage and the door relative to the opening of the vehicle body,
wherein the second movement stage includes a carriage coupled to and forming a link of the parallelogram linkage and includes a track coupled to the inner door structure of the door, the carriage being configured to translate along the track to move the door forward and backward relative to the opening of the vehicle body,
wherein the pivoting of the parallelogram linkage relative to the vehicle body is mechanically linked to translation of the carriage on the track,
wherein the parallelogram linkage and the track are mechanically linked to cause the pivoting of the parallelogram linkage and the translation of the carriage to occur simultaneously, and
wherein the parallelogram linkage and the track are mechanically linked by a first gear pivotably coupled to the carriage and operatively coupled to the parallelogram linkage and a second gear pivotably coupled to the carriage and operatively coupled to the track, wherein the first gear and the second gear are configured to transfer force between the parallelogram linkage and the track to cause the pivoting of the parallelogram linkage and the translation of the carriage to occur simultaneously.

2. The door system of claim 1, wherein the first movement stage is configured to initially move the door from a closed position along a line that is angled no more than five degrees from an outboard direction that is perpendicular to a forward direction of travel of the passenger vehicle.

3. The door system of claim 2, wherein the first movement stage has a range of motion that is greater than 90 degrees.

4. The door system of claim 1, wherein the first gear is operatively coupled to the parallelogram linkage with a link to transfer force therebetween, and the second gear includes a cam follower that is arranged in a slot of the track to transfer force therebetween.

5. A door system for a passenger vehicle comprising:
a door having an outboard door panel, an inboard door panel, and an inner door structure arranged in a cavity defined between the outboard door panel and the inboard door panel, the inboard door panel defining an elongated opening to the cavity which extends in a fore-aft direction of the passenger vehicle;
a track coupled to the inner door structure of the door;
a carriage supported by and translatable along the track in the fore-aft direction as the door is moved between a closed position and an open position;
a mount coupled to and extending inboard from the carriage through the elongated opening, the mount movable along the elongated opening in the fore-aft direction as the carriage translates along the track when the door is moved between the closed position and the open position;
a cover that closes the elongated opening when the door is in the closed position and that translates along the elongated opening to open the elongated opening for the mount to extend therethrough as the door is moved between the closed position and the open position; and
a cover track along which the cover translates, the cover track extending along the elongated opening and curving outboard into the cavity around the track,
wherein the cover is flexible about an upright axis and rigid about a horizontal axis extending in a fore-aft direction of the passenger vehicle, includes upright members that are pivotably coupled to adjacent ones of the upright members at upright pivot joints so as to be flexible about the upright axis and a flexible sheet coupled to and extending over an inboard side of the upright members, and
wherein, when the door is in the closed position, a portion of the cover formed by multiple of the upright members is positioned in the elongated opening and is planar, and when the door is in the open position, the portion of the cover is in the cavity and curved.

6. The door system of claim 5, wherein the upright members each include a male end, a female end, and a planar portion extending therebetween, the male end of one of the upright members being received by the female end of another of the upright members to form the upright pivot joint therebetween.

7. A door system for a passenger vehicle comprising:
a door having an outboard door panel, an inboard door panel, and an inner door structure arranged in a cavity defined between the outboard door panel and the inboard door panel, the inboard door panel defining an elongated opening to the cavity which extends in a fore-aft direction of the passenger vehicle;
a track coupled to the inner door structure of the door;
a carriage supported by and translatable along the track in the fore-aft direction as the door is moved between a closed position and an open position;
a mount coupled to and extending inboard from the carriage through the elongated opening, the mount movable along the elongated opening in the fore-aft direction as the carriage translates along the track when the door is moved between the closed position and the open position; and a cover that closes the elongated opening when the door is in the closed position and that translates along the elongated opening to open the elongated opening for the mount to extend therethrough as the door is moved between the closed position and the open position, wherein the cover is flexible about an upright axis and rigid about a horizontal axis extending in a fore-aft direction of the passenger vehicle, wherein the cover includes upright members that are pivotably coupled to adjacent ones of the upright members at upright pivot joints so as to be flexible about the upright axis, and wherein the cover includes a flexible sheet coupled to and extending over an inboard side of the upright members.

* * * * *